United States Patent
Zhao et al.

(10) Patent No.: US 6,795,752 B1
(45) Date of Patent: Sep. 21, 2004

(54) THERMAL CONVECTION ACCELEROMETER WITH CLOSED-LOOP HEATER CONTROL

(75) Inventors: Yang Zhao, North Andover, MA (US); Adrian Paul Brokaw, Burlington, MA (US); Michael E. Rebeschini, Hanover Park, IL (US); Albert M. Leung, Burnaby (CA); Gregory P. Pucci, Batavia, IL (US); Alexander Dribinsky, Naperville, IL (US)

(73) Assignees: Memsic, Inc., Andover, MA (US); Analog Devices, Inc., Norwood, MA (US)

( * ) Notice: Subject to any disclaimer, the term of this patent is extended or adjusted under 35 U.S.C. 154(b) by 795 days.

(21) Appl. No.: 09/705,996

(22) Filed: Nov. 3, 2000

(51) Int. Cl.[7] .............................................. G01P 15/00
(52) U.S. Cl. .................................. 700/299; 73/514.09
(58) Field of Search ..................... 700/299; 438/50–55; 73/514.01, 514.05, 514.09, 514.33; 257/419, 420, 414

(56) References Cited

U.S. PATENT DOCUMENTS

| | | | |
|---|---|---|---|
| 2,440,189 A | | 4/1948 | Zworykin |
| 2,455,394 A | | 12/1948 | Webber |
| 4,478,077 A | | 10/1984 | Bohrer et al. .................. 73/204 |
| 4,542,650 A | | 9/1985 | Renken et al. ................. 73/204 |
| 4,581,928 A | | 4/1986 | Johnson ......................... 73/204 |
| 4,595,884 A | * | 6/1986 | Miller, Jr. .................... 330/258 |
| 4,637,253 A | | 1/1987 | Sekimura et al. .............. 73/189 |
| 4,651,564 A | | 3/1987 | Johnson et al. ................ 73/204 |
| 5,229,709 A | * | 7/1993 | Pfennings .................... 323/2.82 |
| 5,339,285 A | * | 8/1994 | Straw .......................... 367/135 |
| 5,581,034 A | | 12/1996 | Dao et al. ................. 73/514.09 |
| 5,719,333 A | | 2/1998 | Hosoi et al. .............. 73/514.05 |
| 5,861,775 A | * | 1/1999 | Chen et al. .................... 330/69 |
| 5,945,601 A | * | 8/1999 | Hosoi et al. .............. 73/514.33 |
| 5,959,208 A | | 9/1999 | Muenzel et al. .......... 73/514.32 |
| 6,171,880 B1 | | 1/2001 | Gaitan et al. .................. 438/52 |
| 6,182,509 B1 | * | 2/2001 | Leung ...................... 73/514.05 |
| 6,281,751 B1 | * | 8/2001 | Maulik ........................ 330/255 |
| 6,683,358 B1 | * | 1/2004 | Ishida et al. ................. 257/417 |

OTHER PUBLICATIONS

Lemkin, "A Three–Axis Micromachined Accelerometer with a CMOS Position–Sense Interface and Digital Off-set–Trim Electronics" Apr. 1999, IEEE Journal of SolidState Circuits, vol. 34, No. 4, pp. 456–468.*

*Freeform Fabrication of Functional Microsolenoids, Electromagnets and Helical Springs Using High–Pressure Laser Chemical Vapor Deposition*, K. Williams, et al., pp. 232–237.

*Micromachined Accelerometer Based On Convection Heat Transfer*, A.M. Leung, et al., 0–7803–4412–X/98, 1998 IEEE, pp. 627–630.

*Convection–based Accelerometer and Tilt Sensor Implemented in Standard CMOS*, Velijko Milanovi, et al, International Mechanical Engineering Conference and Exposition, MEMS Symposia, Anaheim, CA, Nov. 18, 1998.

*My Work on MEMS*, Christian Zincke, Sep. 27, 1999, pp. 1–55.

* cited by examiner

Primary Examiner—Leo Picard
Assistant Examiner—Sean Shechtman
(74) *Attorney, Agent, or Firm*—Weingarten, Schurgin, Gagnebin & Lebovici LLP

(57) ABSTRACT

An integrated convective accelerometer device. The device includes a thermal acceleration sensor having a thermopile and a heater element; control circuitry for providing closed-loop control of the thermopile common-mode voltage; an instrumentation amplifier; clock generation circuitry; voltage reference circuitry; a temperature sensor; and, output amplifiers. The device can be operated in an absolute or ratiometric mode. Further, the device is formed in a silicon substrate using standard semiconductor processes and is packaged in a standard integrated circuit package.

25 Claims, 10 Drawing Sheets

THERMAL CONVECTION ACCELEROMETER WITH CLOSED-LOOP HEATER CONTROL

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present invention relates generally to accelerometers, and more specifically to silicon micro-machined convective accelerometers.

Silicon micro-machined accelerometers are known which employ the principle of free convection heat transfer of a hot air bubble in an enclosed chamber to provide a measure of acceleration. Such devices comprise a chamber micro-machined in a silicon substrate, across which is provided a heater resistor and on each side of which is disposed a thermocouple. During zero acceleration, the temperature profile about the heater resistor is symmetrical such that both thermocouples sense the same temperature and therefore provide the same output voltage. Acceleration applied along the thermocouple-heater-thermocouple axis causes disturbance of the temperature profile due to free convection heat transfer, thereby causing an asymmetrical temperature profile which is sensed by the thermocouples to provide output voltages that are different and a differential output voltage that is proportional to the applied acceleration. The differential output voltage typically requires signal conditioning to interface with the electronics of a particular application. Such signal conditioning is implemented using external electronic components and/or circuitry combined on the same substrate as the convective accelerometer.

Conventional silicon micro-machined convective accelerometers have drawbacks in that the sensitivity of these devices can vary. For example, the accelerometer sensitivity may vary with changes in the temperature of the silicon substrate and/or the local environment. The accelerometer sensitivity may also vary with changes in the power dissipated in the heater element.

It would therefore be desirable to have an improved silicon micro-machined convective accelerometer that is less sensitive to temperature and power fluctuations. Such an improved silicon micro-machined convective accelerometer would also have reduced power consumption.

BRIEF SUMMARY OF THE INVENTION

In accordance with the present invention, a silicon micro-machined convective accelerometer is provided in which a thermal acceleration sensor and associated signal conditioning circuitry are included in a single monolithic device. The device is formed in a silicon substrate and is preferably implemented using standard CMOS processes. Integrated within the single monolithic device is the thermal acceleration sensor, heater control circuitry, an instrumentation amplifier, clock generation circuitry, voltage reference circuitry, a temperature sensor, and output amplifiers. The device can be packaged in a standard 8-pin integrated circuit package.

In one embodiment, an integrated convective accelerometer chip includes a convective acceleration sensor including a heater element and a pair of temperature sensing elements disposed on opposing sides thereof. The acceleration sensor is operative to produce a differential output voltage proportional to the magnitude of acceleration applied along an axis passing through the heater element and the pair of temperature sensing elements. The chip further includes amplification circuitry operative to extract an average output voltage from the differential output voltage produced by the acceleration sensor. The average output voltage provides a measure of the temperature gradient produced by the heater element. Still further, the chip includes control circuitry operative to produce a control output. In a preferred embodiment, the control output is a pulsed output voltage and operative to regulate the average output voltage, thereby regulating the temperature gradient produced by the heater element. Yet further, the chip includes a temperature sensor operative to produce a voltage level Proportional To the Absolute Temperature (PTAT) of the chip. Temperature compensation circuitry included on the chip or implemented externally to the chip can use the PTAT voltage level to compensate for changes in the temperature of the chip and/or the local environment.

In a preferred embodiment, the average output voltage and therefore the temperature gradient produced by the heater element are regulated by reading output voltages provided by the pair of temperature sensing elements, comparing these voltages to a reference voltage, producing a pulsed output voltage having a pulse density proportional to the magnitude of a desired output voltage, and regulating the average output voltage using the pulsed output voltage.

Other features, functions, and aspects of the invention will be evident from the Detailed Description of the Invention that follows.

BRIEF DESCRIPTION OF THE SEVERAL VIEWS OF THE DRAWING

The invention will be more fully understood with reference to the following Detailed Description of the Invention in conjunction with the Drawings of which:

FIG. 5b is a timing diagram illustrating clock signals used by the switched capacitor filter of FIG. 5a;

DETAILED DESCRIPTION OF THE INVENTION

Figure 1:
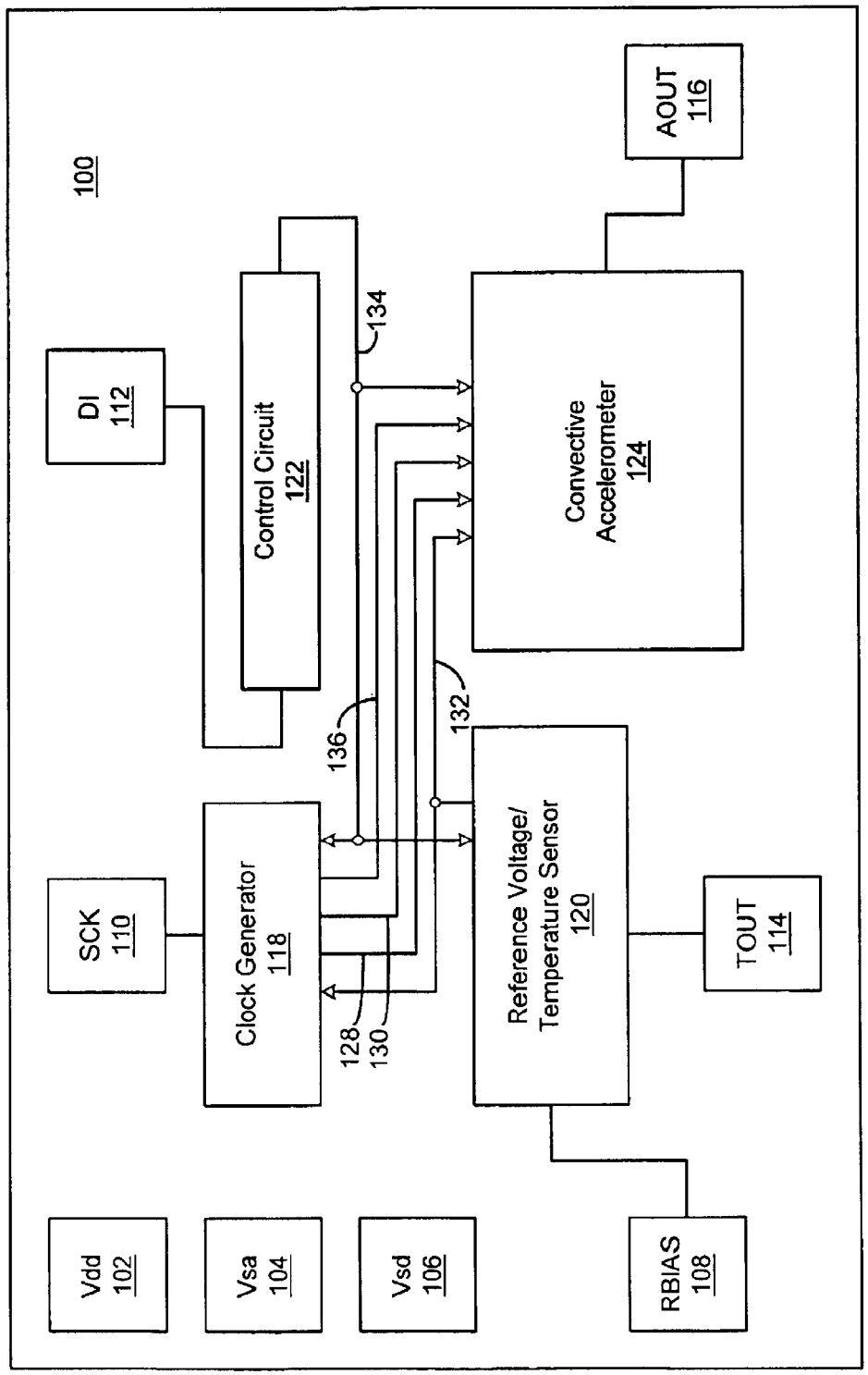
FIG. 1 is a plan view of an integrated circuit including a silicon micro-machined convective accelerometer device in accordance with the present invention.

FIG. 1 is a plan view of an illustrative embodiment of an integrated circuit. ("chip") 100 comprising a silicon micromachined convective accelerometer device according to the present invention. As depicted in FIG. 1, the chip 100 includes a clock generator 118, a voltage reference/temperature sensor 120, a control circuit 122, and a convective accelerometer 124. The chip 100 further includes a plurality of input pads, i.e., an SCK pad 110 and a DI pad 112; a plurality of output pads, i.e., a TOUT pad 114 and a AOUT pad 116; a plurality of voltage pads, i.e., an RBIAS pad 108 and a Vdd pad 102; and, a plurality of ground pads, i.e., a Vsa pad 104 and a Vsd pad 106.

In the illustrated embodiment, the convective accelerometer 124 includes a thermal acceleration sensor and associated signal conditioning circuitry to provide an output voltage at the AOUT pad 116 representative of the magnitude of acceleration along a predetermined axis. In a preferred embodiment, the signal conditioning circuitry associated with the acceleration sensor utilizes a plurality of converter or "chopper" amplifiers, a plurality of switch capacitor circuits, and a sigma-delta modulator. Accordingly, the clock generator 118 provides a plurality of clock signals, i.e., a Ck_ca signal on a line 130, a Ck_sc signal on a line 128, and a Ck_osc signal on a line 136 (see also FIG. 2) to the convective accelerometer 124 for use by the chopper amplifiers, the switched capacitor circuits, and the sigma-delta modulator, respectively. For example, the clock generator 118 may generate the Ck_ca, Ck_sc, and Ck_osc signals using an oscillator included in the clock (n generator 118. Alternatively, the Ck_ca, Ck_sc, and Ck_osc signals may be generated using an external oscillator coupled to the SCK pad 110.

The reference voltage/temperature sensor 120 includes a band-gap voltage reference and associated voltage and current bias generation circuitry to provide a reference voltage, i.e., a voltage, Vbs, on a line 132 (see also FIG. 2) to the convective accelerometer 124 and the clock generator 118 for use as an analog common reference point and/or to bias circuits included therein independent of the supply voltage, Vdd. The current bias generator associated with the band-gap voltage reference comprises an external pull-down resistor coupled to the RBIAS pad 108. Further, the reference voltage/temperature sensor 120 includes a Proportional To Absolute Temperature (PTAT) current source to provide an output voltage at the TOUT pad 114 representative of the absolute temperature of the chip 100.

The control circuit 122 includes a control register that provides control data, i.e., Cntl data comprising a plurality of bits on a control bus 134 (see also FIG. 2) to the clock generator 118, the reference voltage/temperature sensor 120, and the convective accelerometer 124 for use in determining settings of calibration adjustments and configuration switches included therein. The Cntl data is serially input to the control register by way of the DI pad 112. For example, the calibration adjustments included in the clock generator 118, the reference voltage/temperature sensor 120, and the convective accelerometer 124 may be implemented as programmable trimmer potentiometers having resistive values that are programmed by way of predetermined Cntl words provided by the control circuit 122 on the control bus 134.

In a preferred embodiment, the chip 100 is fabricated using a 0.6 μm, double-polysilicon, double-metal (i.e., aluminum, Al), n-well CMOS process. However, it should be understood that other suitable processes for fabricating silicon micro-machinable semiconductor devices may also be used.

Although FIG. 1 does not explicitly depict power bus routing between the power-related pads 102, 104, and 106 and the circuit blocks 118, 120, 122, and 124, it should be understood that the single supply voltage, Vdd, is used by both digital and analog portions of the convective accelerometer device; the ground potential, Vsd, is used as digital ground in the convective accelerometer device; and, the ground potential, Vsa, is used for generating analog voltage levels in the convective accelerometer device. For example, the power bus routing may be implemented on the chip 100 using conventional techniques such as those used to limit positive rail noise and minimize corruption of ground potentials. The circuit blocks 118, 120, 122, and 124 along with their respective connections to the power-related pads 102, 104, and 106 will be explained in further detail below.

Figure 2:
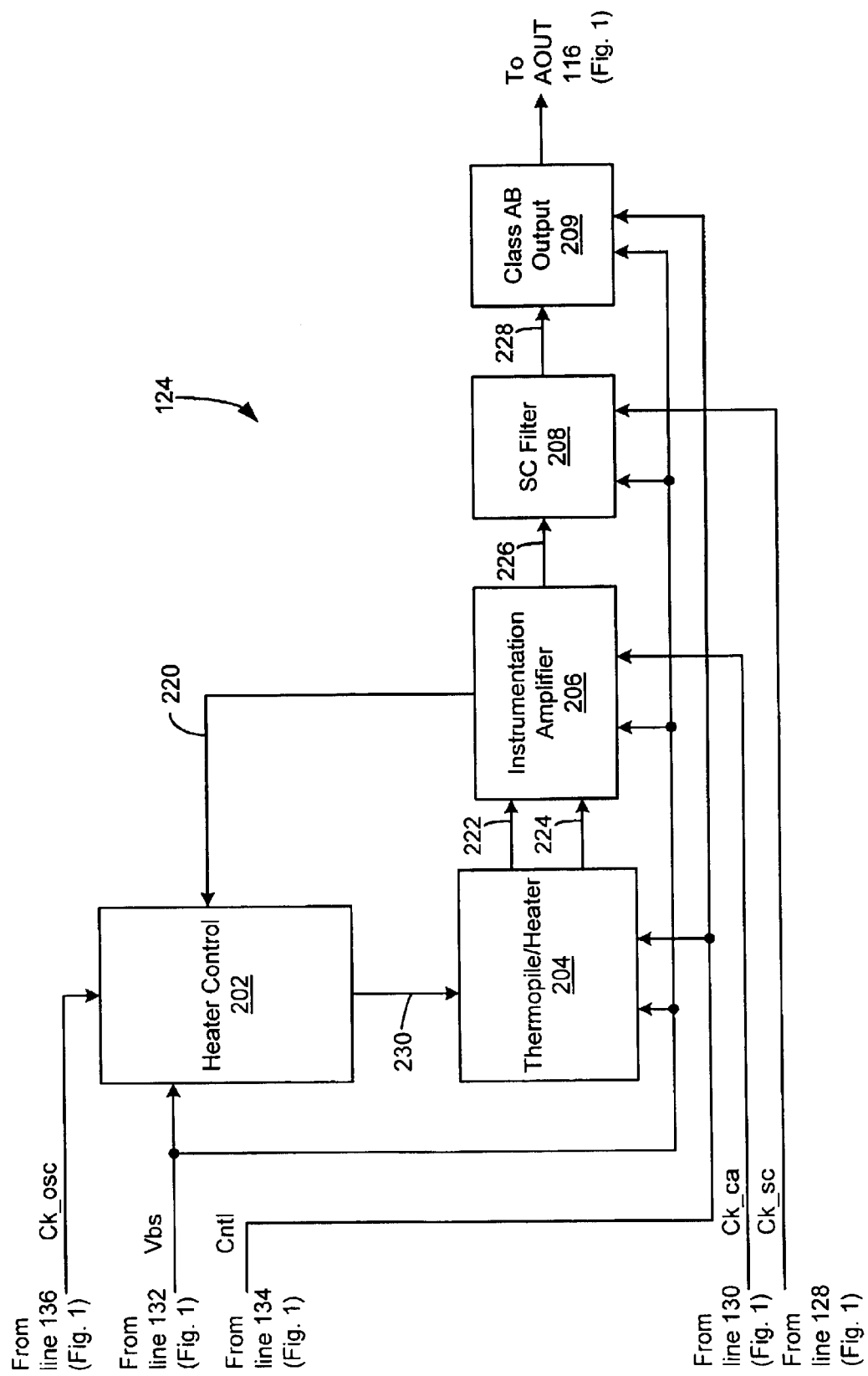
FIG. 2 is a block diagram illustrating a convective accelerometer included in the device of FIG. 1.
Figure 3:
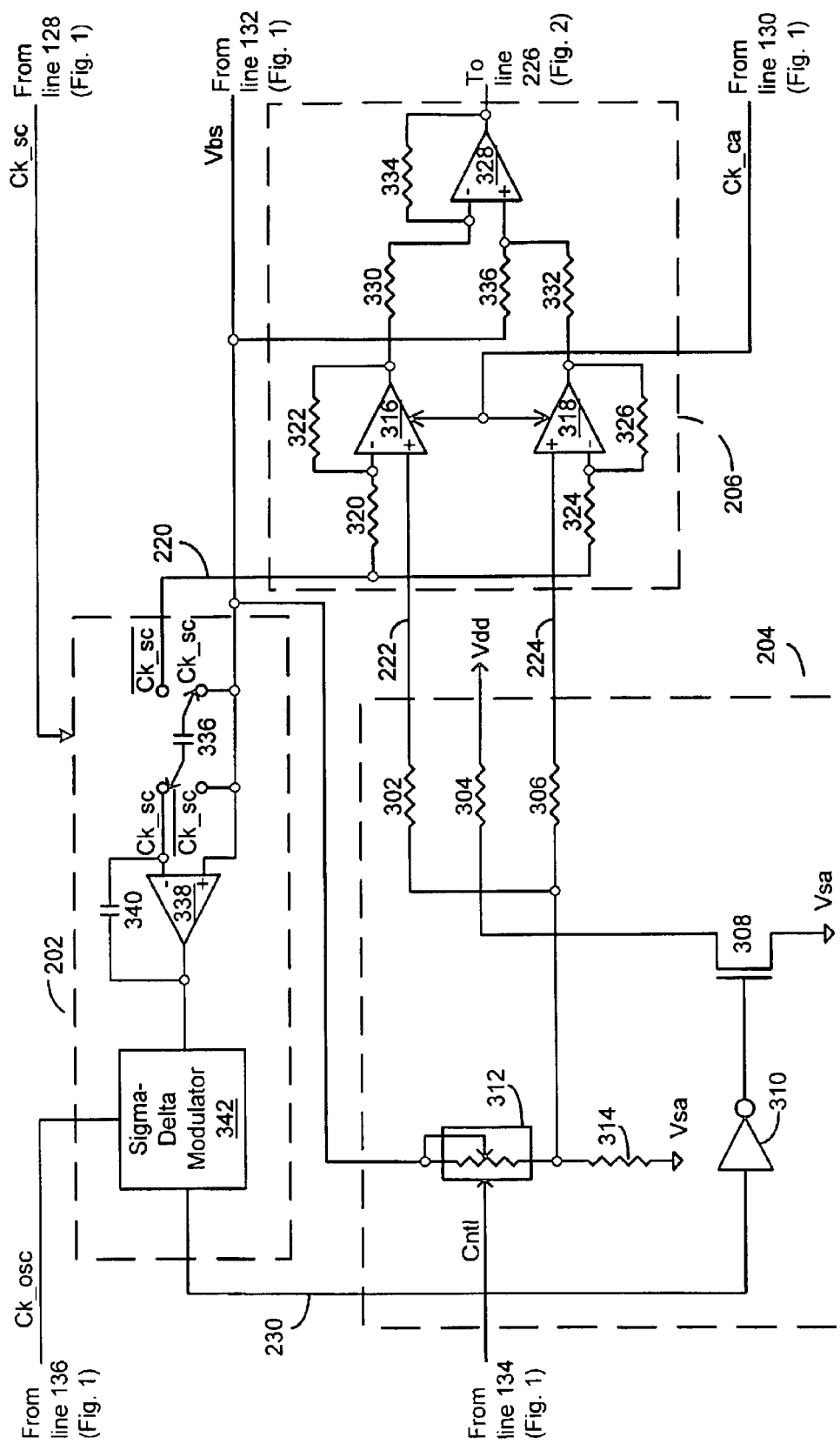
FIG. 3 is a schematic diagram illustrating a thermopile, an instrumentation amplifier, and heater control circuitry included in the convective accelerometer of FIG. 2.

FIG. 2 depicts a block diagram of the convective accelerometer 124, which includes a heater control circuit 202, a thermopile/heater 204, an instrumentation amplifier 206, an SC filter 208, and a class AB output stage 209. Specifically, as shown in FIG. 3, the thermopile/heater 204 includes an array of thermocouples 302 and 306, which are coupled at one end and provide a differential output voltage across lines 222 and 224 at respective opposite ends. Further, the thermocouples 302 and 306 are disposed on opposing sides of a heater element, which in a preferred embodiment is a heater resistor 304.

In this illustrative embodiment, the thermocouples 302 and 306 and the heater resistor 304 are formed using conventional CMOS processing. For example, the thermocouples 302 and 306 may be formed by aluminum and polysilicon layers disposed on a silicon substrate surface of the chip 100; and, the heater resistor 304 may be formed by the polysilicon layer disposed on the substrate surface. Further, in order to form the acceleration sensor of the convective accelerometer device, an enclosed chamber is formed by micro-machining the substrate surface of the chip 100 to create a cavity; and, the heater resistor 304 is suspended across the cavity with the thermocouples 302 and 306 disposed in the cavity on opposing sides of the heater resistor 304. In this illustrative embodiment, the fluid providing the convective heat transfer in the enclosed chamber comprises a quantity of air. Accordingly, an acceleration sensitive axis passes perpendicularly through the heater resistor 304 and the thermocouples 302 and 306 disposed on opposing sides thereof, and the differential output voltage of the thermocouples 302 and 306 provided across the lines 222 and 224 is proportional to the magnitude of acceleration applied along this axis.

Those of ordinary skill in the art will appreciate that the average of the common-mode output voltage of the thermopile comprising the thermocouples 302 and 306 is proportional to the power dissipated in the heater resistor 304, and that the sensitivity of the acceleration sensor included in the convective accelerometer 124 generally varies according to the square of the heater power at low power levels and is generally proportional to the heater power at higher power levels. In this illustrative embodiment, the sensitivity of the convective accelerometer 124 is held at a desired value over power supply voltage variations and/or heater resistor make tolerances by closed-loop control of the common-mode voltage drop across the 1:3 thermocouples 302 and 306, which is a measure of the temperature gradient produced by the heater resistor 304.

Specifically, the common-mode voltage drop across the thermocouples 302 and 306 is set to a desired level using a voltage divider circuit comprising a calibration adjustment 312 connected at one end to the reference voltage, Vbs, and connected in series at an opposing end to a resistor 314, which in turn is coupled to the ground potential, Vsa. Further, the common node of the calibration adjustment 312 and the resistor 314 is connected to the coupled ends of the thermocouples 302 and 306.

Accordingly, the desired common-mode voltage drop across the thermocouples 302 and 306 is set by providing a predetermined Cntl word to the calibration adjustment 312 of the voltage divider via the control bus 134, thereby setting the voltage level at the coupled ends of the thermocouples 302 and 304. The instrumentation amplifier 206 extracts the common-mode output voltage from the voltage provided across the lines 222 and 224, and provides the common-mode output voltage to the heater control 202 on a line 220.

The difference between the common-mode output voltage on the line 220 and the reference voltage, Vbs, is integrated by a switched-capacitor integrator including an operational amplifier 338, a switched input capacitor 336, and an integrating capacitor 340. The output of the integrator is provided to a sigma-delta modulator 342, which generates a pulse density stream that has an average value that is proportional to the output voltage of the integrator. The pulsed output voltage is used to control the common-mode voltage drop across the thermocouples 302 and 306 by turning "on" and "off" a switch transistor 308, which causes the heater resistor 304 to either be open or have the entire power supply voltage across it. In a preferred embodiment, the common-mode voltage drop across the thermocouples 302 and 306 is regulated using Pulse-Density Modulation (PDM). In an alternative embodiment, the common-mode voltage drop across the thermocouples 302 and 306 is regulated using Pulse-Width Modulation (PWM).

As described above, the common-mode voltage drop across the thermocouples 302 and 306 is a measure of the temperature gradient produced by the heater resistor 304. It is noted that in some cases the temperature gradient and therefore the sensitivity of the acceleration sensor are proportional to the power dissipated in the heater resistor 304. When the control loop is regulating, the common-mode output voltage of the thermocouples 302 and 306 will be equal to Vbs. The common-mode voltage drop across the thermocouples 302 and 306 is the voltage difference between Vbs and the voltage at the common point of the thermocouples 302 and 306. In those cases where the sensitivity of the acceleration sensor is proportional to the power dissipated in the heater resistor 304, the voltage at the common point of the thermocouples 302 and 306 can be set by the predetermined Cntl word to allow the power dissipation in the heater resistor 304 and therefore the accelerometer sensitivity to be set to a desired value.

Specifically, the pulsed output voltage of the heater control 202 is used to switch a pass transistor 308 "on" and "off." In a preferred embodiment, the pass transistor 308 is a CMOS n-channel transistor. One terminal of the heater resistor 304 is connected to the supply voltage, Vdd, and another terminal of the heater resistor is coupled to a drain connection of the pass transistor 308. Further, the source connection of the pass transistor 308 is connected to the ground potential, Vsa; and, the gate connection of the pass transistor 308 is connected to the pulsed output voltage of the heater control 202 on the line 230 by way of a inverter buffer 310.

Accordingly, when the pass transistor 308 is switched "on" by the pulsed output voltage of the heater control 202, i.e., when a high logic level of the inverted, pulsed output voltage is applied to the gate connection of the pass transistor 308, current flows through the heater resistor 304 and the pass transistor 308 to the ground potential, Vsa. Alternatively, when the pass transistor 308 is switched "off" by the pulsed output voltage, i.e., when a low logic level of the inverted, pulsed output voltage is applied to the gate connection of the pass transistor 308, no current flows through the heater resistor 304. Because the pulse density of the pulsed output voltage switching the pass transistor 308 "on" and "off" is proportional to the common-mode voltage drop across the thermocouples 302 and 306, the average power provided to the heater resistor 304 from the supply voltage, Vdd, through the pass transistor 308 can be set by setting the voltage at the thermocouple common point using the above-described voltage divider circuit. It should be noted that, in an alternative embodiment, the heater control 202 may provide a continuous output to the thermopile/heater 204 for regulating the current through the heater resistor 304.

As shown in FIG. 3, the instrumentation amplifier 206 includes a differential input stage comprising an operational amplifier ("OpAmp") 316, an input resistor 320, and a feedback resistor 322; and, an OpAmp 318, an input resistor 324, and a feedback resistor 326. In a preferred embodiment, the OpAmps 316 and 318 are chopper amplifiers. The instrumentation amplifier 206 further includes a differential-to-single-ended output stage comprising an OpAmp 328, input resistors 330, 332, and 336, and a feedback resistor 334.

The instrumentation amplifier 206 amplifies the differential output voltage provided by the thermopile/heater 204 across the lines 222 and 224, and converts the differential output voltage to a single-ended output voltage referenced to the analog common reference point, Vbs, on a line 226. The instrumentation amplifier 206 also provides the common-mode output voltage of the thermocouples 302 and 306 to the heater control 202 on the line 220 for use in regulating the average power provided to the heater resistor 304.

In an exemplary configuration of the convective accelerometer device, the sensitivity of the thermopile comprising the thermocouples 302 and 306 is 5 mV/° C.; the sensitivity of the acceleration sensor is 0.05° C./g; and, a corresponding sensitivity at the AOUT pad 116 is 50 mV/g. Accordingly, an acceleration of 10 g applied along the acceleration sensitive axis results in a differential output voltage of 5 mV/° C.×0.05° C./g×10 g, or 2.5 mV across the lines 222 and 224. This produces a sensitivity of 2.5 mV/10 g, or 0.25 mV/g at the output of the thermopile/heater 204. In order to achieve the sensitivity of 50 mV/g at the AOUT Ad pad 116, a combined gain of the instrumentation amplifier 206 and the SC filter 208 is therefore equal to 200. In this exemplary configuration, the instrumentation amplifier 206 has a gain of 100 and the SC filter 208 has a gain of 2 to achieve the combined gain of 200 at the AOUT pad 116. It is noted that the instrumentation amplifier 206 provides the common-mode output voltage to the heater control 202 with unity gain.

In a preferred embodiment, the OpAmp 316 and the resistors 320 and 322, and the OpAmp 318 and the resistors 324 and 326 of the instrumentation amplifier 206 form a pair of non-inverting gain stages, each having the exemplary gain of 100. This means that the differential-to-single-ended output stage comprising the OpAmp 328 and the resistors 330, 332, 334, and 336 has unity gain. In order to achieve the relatively large closed-loop gain of 100, the OpAmps 316 and 318 are preferably implemented as identical chopper amplifiers.

Figure 4:
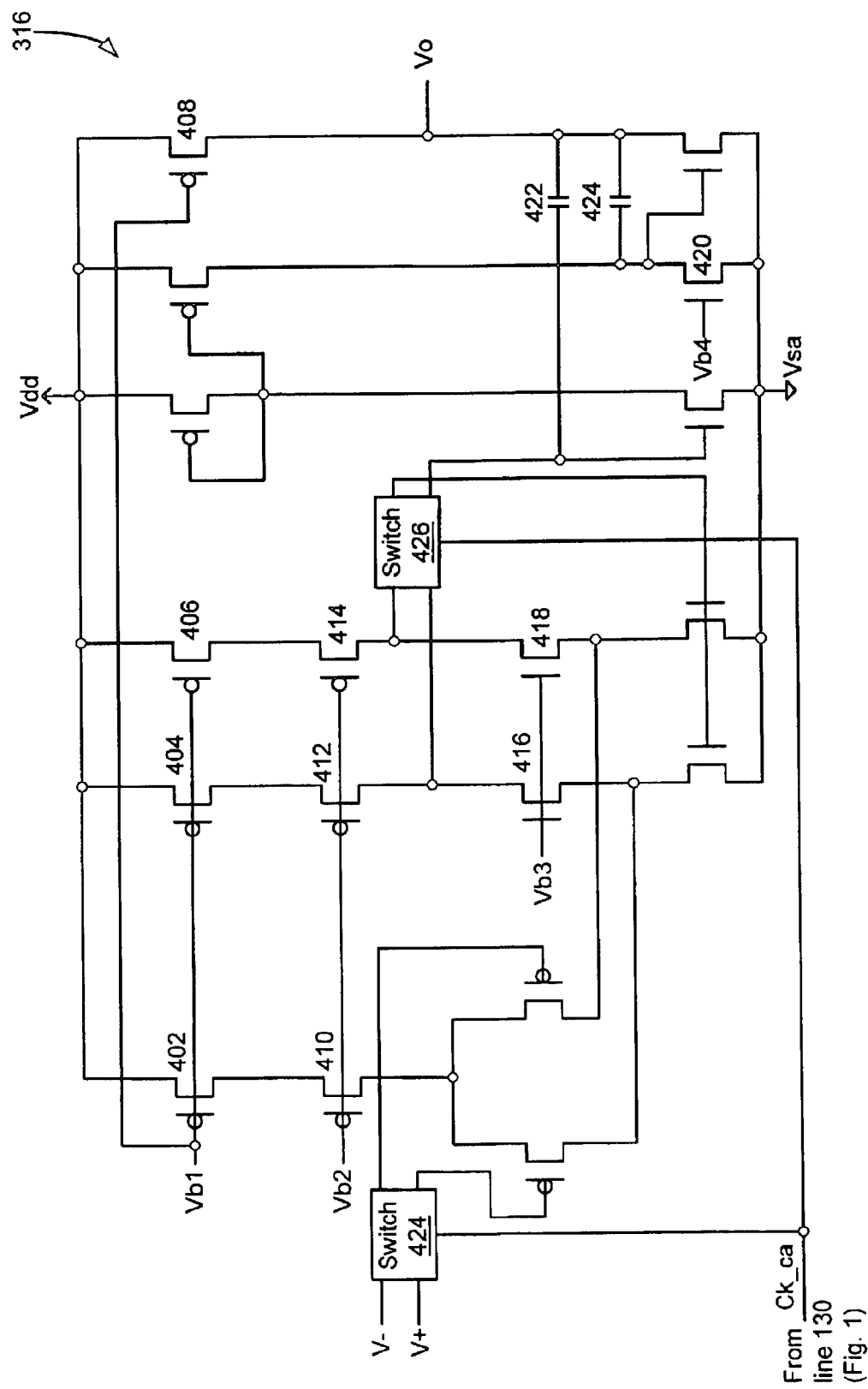
FIG. 4 is a schematic diagram illustrating a chopper amplifier included in the instrumentation amplifier of FIG. 3.

FIG. 4 depicts a schematic diagram of the chopper amplifier 316. Specifically, the chopper amplifier 316 includes a first stage comprising a common-source/common-gate amplifier configuration; and, second and third stages, each comprising a common-source amplifier configuration. Further, a chopper switch 424 is provided at the input of the first stage, and a chopper switch 426 is provided between the first stage and the second stage of the chopper amplifier 316.

The common-source/common-gate amplifier configuration of the first stage of the chopper amplifiers 316 and 318 improves voltage gain for achieving the relatively large closed-loop gain of 100. Further, in the above-mentioned exemplary configuration, the Ck_ca signal clocking the chopper switches 424 and 426 has a nominal frequency of 25 kHz. As a result, any offset and/or low-frequency noise produced by the chopper amplifiers 316 and 318 are modulated at the chopper frequency of 25 kHz and subsequently removed by the low-pass SC filter 208 (see FIG. 2).

Suitable bias voltages Vb1, Vb2, Vb3, and Vb4 are provided at gate connections of p-channel transistors 402, 404, 406, and 408; p-channel transistors 410, 412, and 414; n-channel transistors 416 and 418; and, an n-channel transistor 420, respectively. For example, the Vb1, Vb2, Vb3, and Vb4 bias voltage levels may be generated using a voltage bias generator 740 (see FIG. 7) included in the reference voltage/temperature sensor 120 (see FIG. 1).

Further, the chopper amplifiers 316 and 318 are frequency compensated using capacitors 422 and 424 and nested Miller compensation techniques. In the exemplary configuration, the chopper amplifiers 316 and 318 are overcompensated to provide, at the exemplary gain of 100, low-pass filters with poles at a nominal frequency of 5 kHz. The low-pass filtering performed by the non-inverting gain stages including the chopper amplifiers 316 and 318 therefore band-limits any thermal noise that might otherwise be shifted-down to the pass-band by aliasing at the SC filter 208.

As shown in FIG. 3, the heater control 202 includes a switched capacitor integrator stage comprising a switched capacitor 336 and associated switches (not numbered), an OpAmp 338, and a feedback capacitor 340; and, a sigma-delta modulator 342, which is preferably a first-order sigma-delta modulator. For example, the switches associated with the switched capacitor 336 may be implemented using CMOS transmission gates; and, the complementary Ck_sc signals controlling the CMOS transmission gates may be implemented as non-overlapping clock phases. In the exemplary configuration, the Ck_sc signal has a nominal frequency of 50 kHz; and, the Ck_osc signal clocking the sigma-delta modulator 342 has a nominal frequency of 800 kHz.

The switched capacitor integrator stage amplifies and low-pass filters the common-mode output voltage of the thermocouples 302 and 306 provided by the instrumentation amplifier 206 on the line 220, and provides an amplified and filtered output voltage to the sigma-delta modulator 342. For example, to ensure stability of the feedback circuit comprising the heater control 202, the feedback circuit may be compensated using the dominant pole provided by the switched capacitor integrator stage. Moreover, in order to achieve optimal phase margin, the switched capacitor integrator stage is implemented as a non-inverting stage having a relatively low unity gain frequency, e.g., 5 Hz.

The sigma-delta modulator 342 generates the above-mentioned pulsed output voltage, which has a pulse density proportional to the integrator output voltage, and provides the pulsed output voltage to the inverter buffer 310 of the thermopile/heater 204 on the line 230. Specifically, the common-mode output voltage of the thermocouples 302 and 306 is set to the desired level, and the heater control 202 provides negative feedback between the instrumentation amplifier 206 and the thermopile/heater 204 that causes the average density of the pulsed output voltage to track the desired common-mode output voltage level. The inverter 310 buffers and inverts the pulsed output voltage, and provides the inverted pulse sequence to the gate connection of the pass transistor 308, thereby regulating the average power provided to the heater resistor 304. Because the pulsed output voltage is inverted by the inverter 310, the pulse density applied to the pass transistor 308 is a decreasing function of the difference between the common-mode voltage and the analog common reference point.

It should be noted that switching the pass transistor 308 "on" and "off" using the pulse sequence generated by the sigma-delta modulator 342 causes the power provided to the heater resistor 304 from the supply voltage, Vdd, through the pass transistor 308 to be pulsed. In the above-mentioned exemplary configuration, the accelerometer sensor comprising the heater resistor 304 and the thermocouples 302 and 306 has a relatively low-frequency double pole at about 80 Hz. Accordingly, in the exemplary configuration, the acceleration sensor attenuates the high frequency content of the pulsed power provided to the heater resistor 304, thereby averaging the heater power to provide substantially constant voltages across the lines 222 and 224. The relatively high frequency of the Ck_osc signal clocking the sigma-delta modulator 342 increases this attenuation. It is also noted that switching the pass transistor 308 "on" and "off" as described above reduces the power dissipated by the pass transistor 308.

If the heater resistor 304 fails, e.g., if the failed heater resistor 304 causes an open circuit between the supply voltage, Vdd, and the drain connection of the pass transistor 308, then the heater control 202 will be incapable of regulating the power in the acceleration sensor. For example, such a failure may cause the output voltage of the switched capacitor integrator stage to swing to the ground potential, Vsa. In this illustrative embodiment, the output voltage of the switched capacitor integrator stage is continuously compared with a threshold voltage near the ground potential, Vsa; and, when the integrator output voltage passes through the threshold voltage, a "Fail" signal is generated to indicate the failure of the acceleration sensor.

Figure 5A:
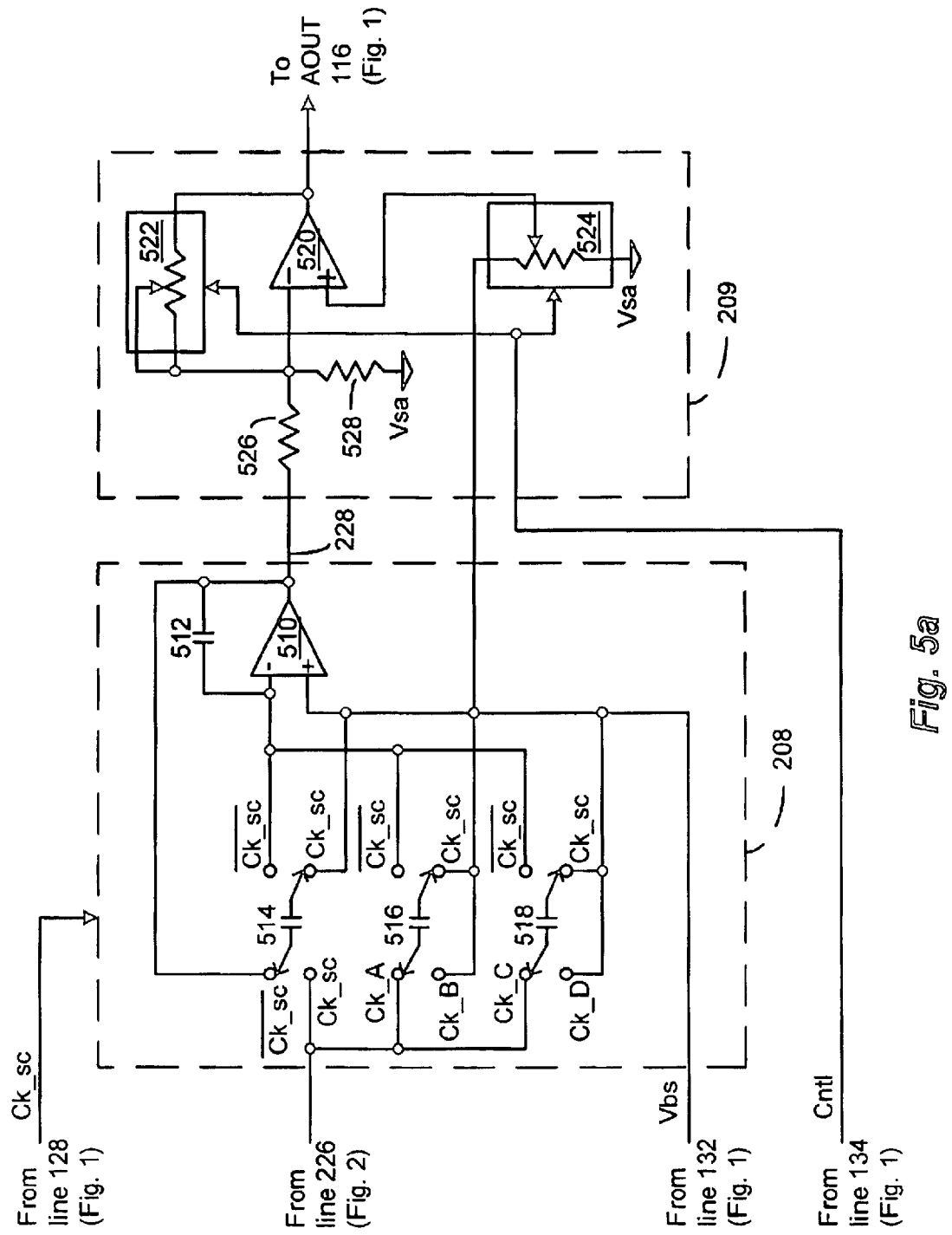
FIG. 5a is a schematic diagram illustrating a switched capacitor filter and a class AB output stage included in the convective accelerometer of FIG. 2.

FIG. 5a depicts schematic diagrams of the SC filter 208 and the class AB output stage 209 included in the convective accelerometer 124. Specifically, the SC filter 208 includes an OpAmp 510, a feedback capacitor 512, and a plurality of switched capacitors 514, 516, and 518 and associated switches (not numbered); and, the class AB output stage 209 includes an OpAmp 520, input resistors 526 and 528, and calibration adjustments 522 and 524.

Figure 5B:
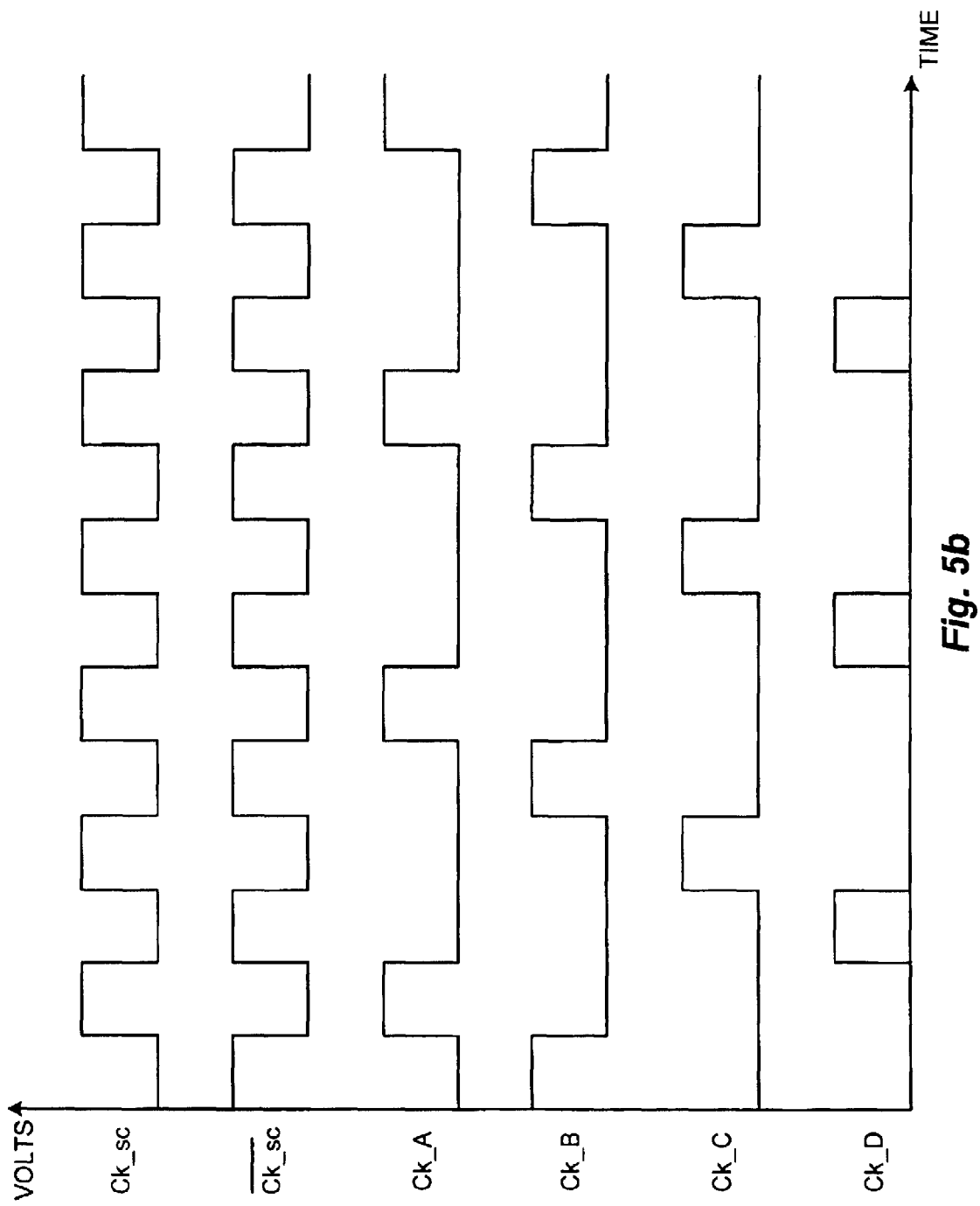

The switches associated with the switched capacitors 514, 516, and 518 may be implemented using CMOS transmission gates. Further, the switches associated with the switched capacitor 514 are controlled by the non-overlapping, complementary Ck_sc signals; the switches associated with the switched capacitor 516 are controlled by the complementary Ck_sc signals, a Ck_A clock signal, and a Ck_B clock signal; and, the switches associated with the switched capacitor 518 are controlled by the complementary Ck_sc signals, a Ck_C clock signal, and a Ck_D clock signal. FIG. 5b depicts the relative timing of the complementary Ck_sc signals; and, the Ck_A, Ck_B, Ck_C, and Ck_D signals. For example, the Ck_A, Ck_B, Ck_C, and Ck_D signals may be derived from the complementary Ck_sc signals using conventional techniques.

In the above-mentioned exemplary configuration, the SC Fog filter 208 has a pole at a nominal frequency of 100 Hz. Further, the switched capacitors 516 and 518 are controlled to generate a notch in the output voltage of the SC filter 208 at the chopping frequency of 25 kHz. Still further, values of the feedback capacitor 512 and the switched capacitors 514, 516, and 518 are chosen to provide the exemplary gain of 2.

The SC filter 208 amplifies and low-pass filters the output voltage provided by the instrumentation amplifier 206 on the line 226 to remove the low-frequency noise produced by the chopper amplifiers 316 and 318 and the thermal noise generated in the convective accelerometer device, and provides an amplified and filtered output to the class AB output stage 209.

The calibration adjustments 522 and 524 of the class AB output stage 209 are used for calibrating output gain and offset, respectively, of the convective accelerometer device. Specifically, the output gain is calibrated by providing a predetermined Cntl word to the calibration adjustment 522, and the output offset is similarly calibrated by providing a predetermined Cntl word to the calibration adjustment 524, via the control bus 134.

Figure 6:
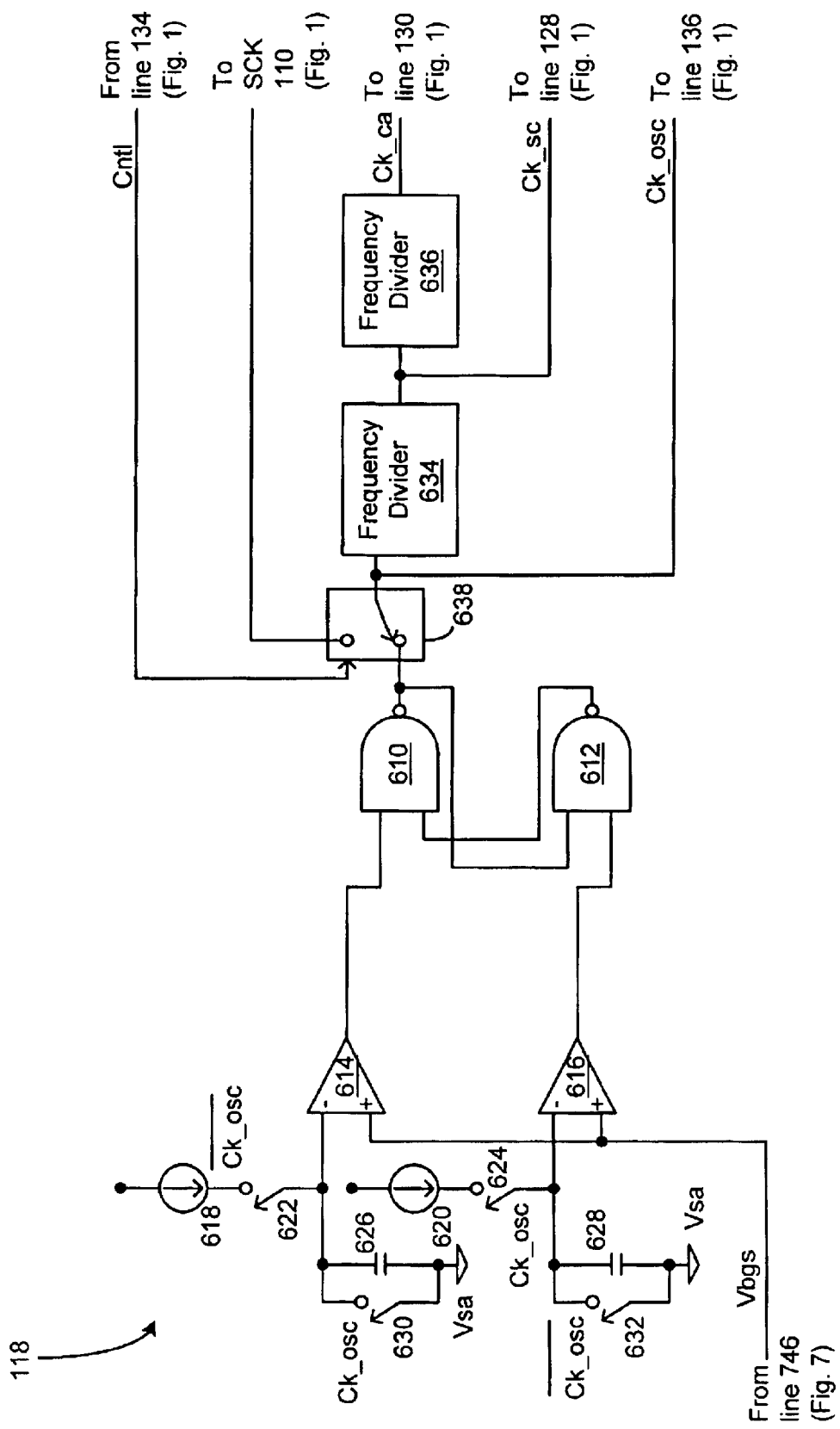
FIG. 6 is a schematic diagram illustrating a clock generator included in the device of FIG. 1.

FIG. 6 depicts a schematic diagram of the clock generator 118 (see also FIG. 1). Specifically, the clock generator 118 includes a current source 618 and switches 622 and 630 for charging and discharging a capacitor 626; a current source 620 and switches 624 and 632 for charging and discharging a capacitor 628; comparators 614 and 616 coupled to the capacitors 626 and 628, respectively, and a band-gap reference voltage, Vbgs (see FIG. 7); an SR latch comprising NAND gates 610 and 612; frequency dividers 634 and 636; and, a configuration switch 638 for selectively providing either the output of the SR latch or a clock signal produced by the external oscillator to the frequency divider 634. For example, the current sources 618 and 620 may be implemented using a current bias generator 742 (see FIG. 7) and the external resistor coupled to the RBIAS pad 108 (see FIG. 1); and, the switches 622, 630, 624, and 632 may be implemented using suitable respective pass transistors. The switches 624 and 630 are controlled by the Ck__osc signal, and the switches 622 and 632 are controlled by the complement of the Ck__osc signal.

Accordingly, if the Ck__osc signal is initially at a low logic level, then the switch 632 is actuated to discharge the capacitor 628 to the ground potential, Vsa, and the switch 622 is actuated to charge the capacitor 626. When the capacitor 626 is charged to a voltage level greater than the band-gap reference voltage level, Vbgs, the output state of the comparator 614 transitions from a high logic level to the low logic level, thereby transitioning the output state of the NAND gate 610 from the low logic level to the high logic level. As a result, the Ck__osc signal is now at the high logic level, thereby actuating the switch 630 to discharge the capacitor 626 to the ground potential, Vsa, and actuating the switch 624 to charge the capacitor 628. When the capacitor 628 is charged to a voltage level greater than the band-gap reference voltage level, Vbgs, the output state of the comparator 616 transitions from the high logic level to the low logic level, thereby transitioning the output state of the NAND gate 610 from the high logic level CZ to the low logic level. In this way, the capacitors 626 and 628 are periodically charged and discharged for internally generating the Ck__osc clock signal on the line 136 (see also FIG. 1)

In the above-mentioned exemplary configuration, the values of the currents provided by the current sources 618 and 620 and the values of the capacitors 626 and 628 are selected to generate the Ck__osc signal with the nominal frequency of 800 kHz.

The configuration switch 638 is set by providing a predetermined Cntl word to the calibration switch 638 via the control bus 134 to select either the internally generated clock signal or the clock signal generated by the external oscillator coupled to the SCK pad 110. As a result, the internally generated clock signal or the externally generated clock signal is provided to the frequency divider 634, which divides the frequency of either one of these clock signals by sixteen (16) to generate the Ck__sc signal. The frequency divider 636 then divides the Ck__sc signal at its input by two (2) to generate the Ck__ca signal. In the exemplary configuration, the Ck__osc signal has the nominal frequency of 800 kHz, thereby causing the Ck__sc and Ck__ca signals to have the nominal frequencies of 50 kHz and 25 kHz, respectively.

Figure 7:
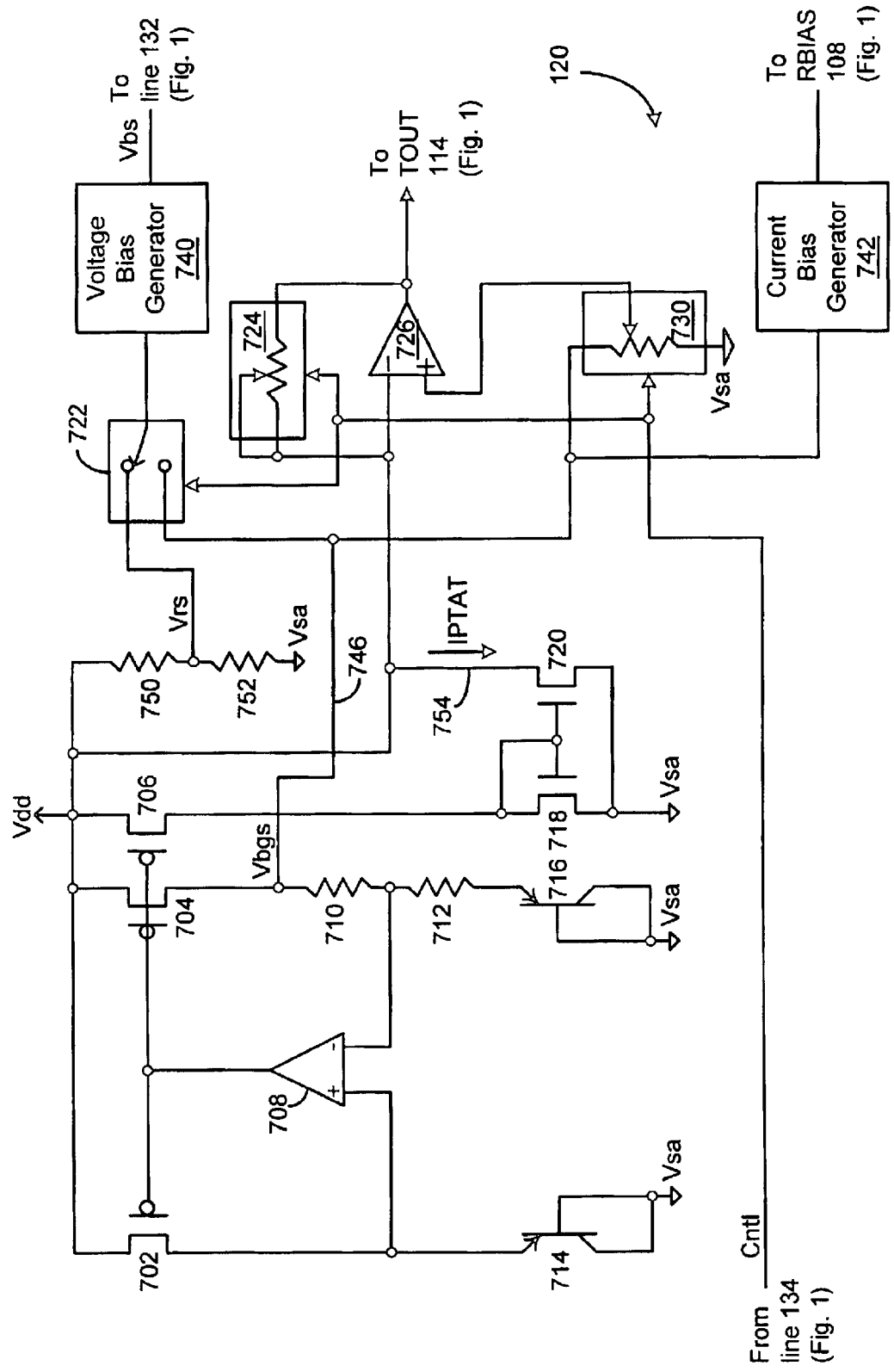
FIG. 7 is a schematic diagram illustrating a reference voltage/temperature sensor circuit included in the device of FIG. 1.

FIG. 7 depicts a schematic diagram of the reference voltage/temperature sensor 120 (see also FIG. 1). Specifically, the reference voltage/temperature sensor 120 includes an OpAmp 708; p-channel transistors 702, 704, and 706; n-channel transistors 718 and 720; bipolar junction transistors 714 and 716; and, resistors 710 and 712 to provide the band-gap reference voltage, Vbgs, on the line 746. For example, the bipolar junction transistors 714 and 716 may be implemented as vertical, common-collector transistors. In the above-mentioned exemplary configuration, the band-gap reference voltage, Vbgs, has a value of about 1.2 volts.

The reference voltage/temperature sensor 120 further includes a voltage divider comprising serially coupled resistors 750 and 752 connected between the supply voltage, Vdd, and the ground potential, Vsa; and, a configuration switch 722 for selectively providing either the voltage level, Vrs, at the common node of the resistors 750 and 752 or the band-gap reference voltage, Vbgs, on the line 746 to the voltage bias generator 740. The configuration switch 722 is set by providing a predetermined Cntl word to the calibration switch 722 via the control bus 134 to select either the Vrs or Vbgs voltage level. The selected voltage level is then provided to the voltage bias generator 740, which provides the reference voltage, Vbs, on the line 132 (see also FIG. 1).

In the exemplary configuration, if the configuration switch 722 is set to provide the Vbgs voltage level to the voltage bias generator 740, then the convective accelerometer 124 (see FIG. 1) operates in an absolute mode and the reference voltage, Vbs, has a value of about 1.0 volts. Alternatively, if the configuration switch 722 is set to provide the Vrs voltage level to the voltage bias generator 740, then the convective accelerometer 124 operates in a ratiometric mode and the reference voltage, Vbs, has a value of about one-third of the supply voltage, Vdd. In this illustrative embodiment, the convective accelerometer 124 is also made less sensitive to power fluctuations by setting the reference voltage, Vbs, to the fixed value of 1.0 volts. It should be noted that when the convective accelerometer 124 operates in the ratiometric mode with the reference voltage, Vbs, set to the Vrs voltage level, the sensitivity of the acceleration sensor is proportional to the supply voltage level, Vdd.

Still further, the reference voltage/temperature sensor 120 includes a current mirror comprising the n-channel transistors 718 and 720 for providing a PTAT current, $I_{PTAT}$, on a line 754. The PTAT current, $I_{PTAT}$, is provided to a current-to-voltage converter comprising an OpAmp 726 and calibration adjustments 724 and 730 to generate an output voltage at the TOUT pad 114 (see FIG. 1) that is proportional to $I_{PTAT}$, which in turn is proportional to the absolute temperature of the chip 100. In this illustrative embodiment, the convective accelerometer 124 is made less sensitive to temperature fluctuations by providing the output voltage at the TOUT pad 114 to temperature compensation circuits either external to or on the same substrate as the convective accelerometer 124 to compensate for changes in the temperature of the chip 100 and/or the local environment.

The calibration adjustments 724 and 730 of the current-to-voltage converter are used for calibrating output gain and offset, respectively, of the temperature sensor 120. Specifically, the output gain is calibrated by providing a predetermined Cntl word to the calibration adjustment 724, and the output offset is similarly calibrated by providing a predetermined Cntl word to the calibration adjustment 730, via the control bus 134.

Figure 8:
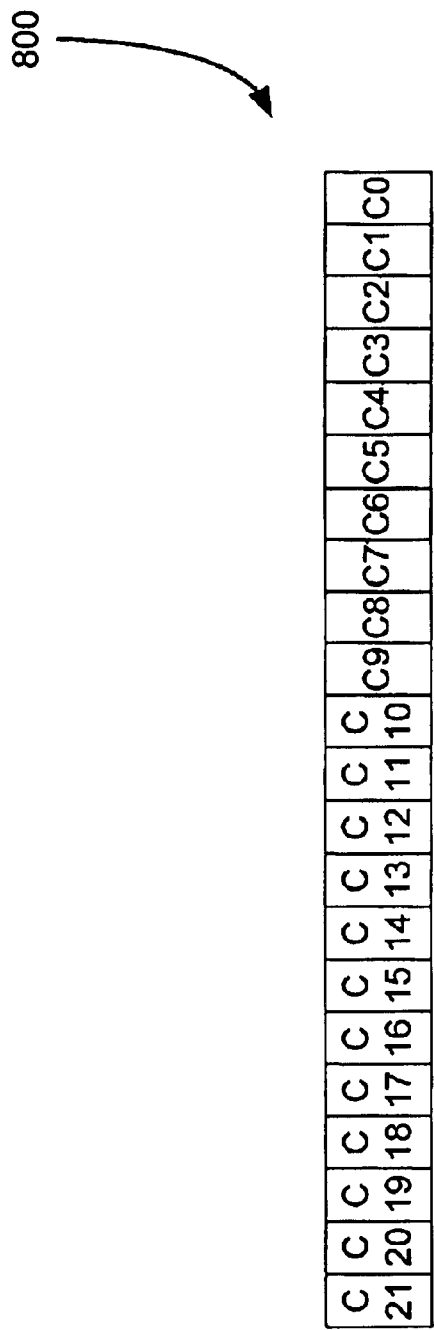
FIG. 8 is a plan view of a control register of a control circuit included in the device of FIG. 1.

FIG. 8 depicts a 22-bit control register 800 included in the control circuit 122 (see FIG. 1) for providing the Cntl data to the clock generator 118, the reference voltage/temperature sensor 120, and the convective accelerometer 124 to determine the settings of the calibration adjustments 312, 522, 524, 724, and 730, and the configuration switches 638 and 722. As described above, the Cntl data is serially input to the control register 800 via the DI pad 112 (see FIG. 1) and output in parallel on the control bus 134.

In the above-mentioned exemplary configuration, the twenty-two (22) control bits are defined as follows:

| | |
|---|---|
| C0 | Determines the setting of the configuration switch 722. For example, if C0 = 0, then Vbs = Vbgs; and, if C0 = 1, then Vbs = Vrs. |
| C1 | Determines the setting of the configuration switch 638. For example, if C1 = 0, then Ck_osc, Ck_sc, and Ck_ca are generated by the internal clock; and, if C1 = 1, then Ck_osc, Ck_sc, and Ck_ca are generated by the external clock. |
| C2–C5 | Determine the setting of the calibration adjustment 724. For example, the Cntl word "C2–C5" may be interpreted as a 2's complement number with "0000" representing a nominal trim setting. |
| C6–C9 | Determine the setting of the calibration adjustment 730. For example, the Cntl word "C6–C9" may be interpreted as a 2's complement number with "0000" representing a nominal trim setting. |
| C10–C13 | Determine the setting of the calibration adjustment 522. For example, the Cntl word "C10–C13" may be interpreted as a 2's complement number with "0000" representing a nominal trim setting. |
| C14–C17 | Determine the setting of the calibration adjustment 524. For example, the Cntl word "C14–C17" may be interpreted as a 2's complement number with "0000" representing a nominal trim setting. |
| C18–C21 | Determine the setting of the calibration adjustment 312. For example, the Cntl word "C18–C21" may be interpreted as a 2's complement number with "0000" representing a nominal trim setting. |

Figure 9:
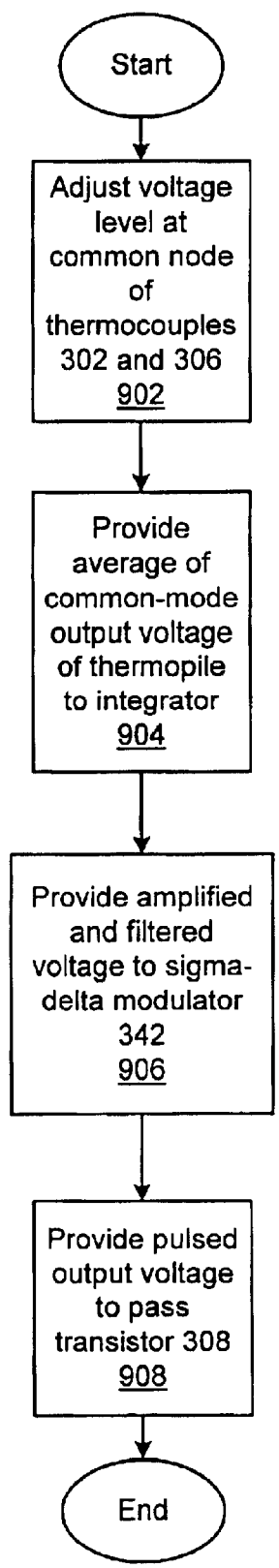
FIG. 9 is a flow diagram illustrating a method of regulating power dissipated in an acceleration sensor included in the convective accelerometer of FIG. 2.

An illustrative method of regulating the thermopile common-mode voltage and therefore the temperature gradient produced by the heater using the above-described feedback circuit is illustrated by reference to FIG. 9. As depicted in step 902, the calibration adjustment 312 is adjusted to set the voltage level at the coupled ends of the thermocouples 302 and 306. In a preferred embodiment, this voltage level is adjusted to be slightly less than the reference voltage, Vbs. Further, the polarities of the thermocouples 302 and 306 are such that an increase in the power delivered to the heater resistor 304 causes increasingly positive output voltages to be applied to lines 222 and 224, respectively, at the input of the instrumentation amplifier 206. It should be noted that in the absence of acceleration, the respective output voltages on the lines 222 and 224 are equal because of the w symmetrical configuration of the acceleration sensor. The average of the common-mode output voltage of the thermopile comprising the thermocouples 302 and 306 is then provided, as depicted in step 904, by the instrumentation amplifier 206 to the switched capacitor integrator stage. Next, an amplified and filtered voltage is provided, as depicted in step 906, by the switched capacitor integrator stage to the sigma-delta modulator 342. A pulsed output voltage having a pulse density proportional to the integrator output voltage is then provided, as depicted in step 908, by the sigma-delta modulator 342 to the pass transistor 308 to regulate the thermopile common-mode voltage. When the control loop is regulating, the power dissipated in the heater resistor 304 will cause the average of the common-mode output voltage of the thermopile to be equal to Vbs. In the case where the power dissipated in the heater resistor 304 is proportional to the common-mode voltage drop across the thermocouples 302 and 306, the heater power can be controlled by changing the voltage at the thermocouple common point through the adjustment 312.

Those of ordinary skill in the art will appreciate that variations to and modification of the above-described silicon micro-machined convective accelerometer device may be made without departing from the inventive concepts disclosed herein. Accordingly, the invention should not be viewed as limited except as by the scope and spirit of the appended claims.

What is claimed is:

1. An integrated convective accelerometer chip, comprising:

a convective acceleration sensor including a heater element and a plurality of temperature sensing elements, the plurality of temperature sensing elements being operative to generate a differential output voltage indicative of a magnitude of acceleration applied along at least one axis passing through the heater element and the plurality of temperature sensing elements;

amplification circuitry configured to receive the differential output voltage generated by the plurality of temperature sensing elements and operative to generate a corresponding common-mode output voltage, wherein the common-mode output voltage generated by the amplification circuitry is representative of a common-mode voltage across the plurality of temperature sensing elements; and control circuitry configured to receive the common-mode output voltage generated by the amplification circuitry and operative to generate a control output proportional thereto, the control circuitry being further operative to regulate the common-mode voltage across the temperature sensing elements using the control output.

2. An integrated convective accelerometer chip, comprising:

a convective acceleration sensor including a heater element and a plurality of temperature sensing elements, the plurality of temperature sensing elements being operative to generate a differential output voltage indicative of a magnitude of acceleration applied along at least one axis passing through the heater element and the plurality of temperature sensing elements;

amplification circuitry configured to receive the differential output voltage generated by the plurality of temperature sensing elements and operative to generate a corresponding common-mode output voltage; and control circuitry configured to receive the common-mode output voltage generated by the amplification circuitry and operative to generate a control output proportional thereto, the control circuitry being further operative to regulate the common-mode output voltage using the control output, wherein the control circuitry is operative to regulate the common-mode voltage across the temperature sensing elements by regulating a current through the heater element.

3. The chip of claim 2 wherein the control output is a pulsed output and the control circuitry is operative to regulate the current through the heater element using pulse modulation.

4. The chip of claim 3 wherein the control circuitry is operative to regulate the current through the heater element using pulse-density modulation.

5. The chip of claim 3 wherein the control circuitry is operative to regulate the current through the heater element using pulse-width modulation.

6. The chip of claim 3 wherein the control circuitry includes a sigma-delta modulator operative to generate the pulsed output.

7. The chip of claim 3 wherein the heater element has a first terminal connected to a supply voltage and a second terminal, and wherein the convective acceleration sensor further includes a pass transistor having a drain connection coupled to the second terminal of the heater element, a source connection coupled to ground potential, and a gate connection controlled by the pulsed output generated by the control circuitry.

8. The chip of claim 1 further including a reference voltage generator operative to generate a reference voltage level.

9. The chip of claim 8 wherein the reference voltage level is a fixed voltage level.

10. The chip of claim 8 wherein the reference voltage level is proportional to a supply voltage level.

11. The chip of claim 8 wherein each temperature sensing element has a respective first terminal and a respective second terminal, wherein the respective second terminals of the temperature sensing elements are connected, wherein the acceleration sensor is operative to generate the differential output voltage across the respective first terminals of the temperature sensing elements, and wherein the acceleration sensor is further operative to set the connected respective second terminals of the temperature sensing elements to a desired voltage level proportional to the reference voltage level.

12. The chip of claim 8 wherein the reference voltage generator is further operative to generate a level proportional to the absolute temperature of the chip.

13. The chip of claim 1 wherein acceleration sensor including the heater element and the plurality of temperature sensing elements are silicon micro-machined devices.

14. The chip of claim 1 wherein the common-mode voltage across the temperature sensing elements is proportional to power dissipated in the heater element.

15. A method of operating a convective acceleration sensor, the convective acceleration sensor including a heater element and a plurality of temperature sensing elements, the method comprising the steps of:

generating a differential output voltage by the plurality of temperature sensing elements, the differential output voltage being indicative of a magnitude of acceleration applied along at least one axis passing through the heater element and the plurality of temperature sensing elements;

generating a common-mode output voltage corresponding to the differential output voltage, the common-mode output voltage being representative of a common-mode voltage across the plurality of temperature sensing elements;

generating a control output proportional to the common-mode output voltage; and regulating the common-mode voltage across the temperature sensing elements using the control output.

16. A method of operating an integrated convective accelerometer chip, the chip including a convective acceleration sensor having a heater element and a plurality of temperature sensing elements, the method comprising the steps of:

generating a differential output voltage indicative of a magnitude of acceleration applied along at least one axis passing through the heater element and the plurality of temperature sensing elements;

generating a common-mode output voltage corresponding to the differential output voltage;

generating a control output proportional to the common-mode output voltage; and regulating the common-mode output voltage using the control output, wherein the regulating step includes the substep of regulating a current through the heater element.

17. The method of claim 16 wherein the control output generated in the third generating step is a pulsed output, and the regulating step includes the substep of regulating the current through the heater element using pulse modulation.

18. The method of claim 17 wherein the pulse modulation used in the regulating step is pulse-density modulation.

19. The method of claim 17 wherein the pulse modulation used in the regulating step is pulse-width modulation.

20. The method of claim 15 wherein the second generating step includes the substep of setting the common-mode voltage across the temperature sensing elements to a desired level.

21. The method of claim 15 further including the steps of converting the differential output voltage to a single-ended output voltage indicative of the magnitude of acceleration applied along the at least one axis, and setting the single-ended output voltage to provide a desired level of gain.

22. The method of claim 17 wherein the regulating step includes the substep of applying the pulsed output to a gate connection of a pass transistor connected between a terminal of the heater element and ground potential.

23. The method of claim 15 further including the step of producing a level proportional to the absolute temperature of the convective acceleration sensor.

24. The method of claim 23 further including the step of temperature compensating the convective acceleration sensor using the level proportional to the absolute temperature.

25. The method of claim 15 wherein the common-mode voltage across the temperature sensing elements is proportional to power dissipated in the heater element of the convective acceleration sensor.

* * * * *

UNITED STATES PATENT AND TRADEMARK OFFICE
CERTIFICATE OF CORRECTION

PATENT NO. : 6,795,752 B1  
DATED : September 21, 2004  
INVENTOR(S) : Yang Zhao et al.

Page 1 of 1

It is certified that error appears in the above-identified patent and that said Letters Patent is hereby corrected as shown below:

<u>Column 3,</u>  
Line 31, "clock (n" should read -- clock --;

<u>Column 4,</u>  
Line 61, delete "1:3";

<u>Column 6,</u>  
Line 47, delete "Ad";

<u>Column 9,</u>  
Line 2, delete "Fog"; and  
Line 60, delete "CZ".

Signed and Sealed this

Twenty-first Day of March, 2006

JON W. DUDAS  
*Director of the United States Patent and Trademark Office*